United States Patent
Yoo et al.

(10) Patent No.: US 10,254,019 B2
(45) Date of Patent: Apr. 9, 2019

(54) HEAT PUMP SYSTEM IN VEHICLE

(71) Applicant: Hyundai Motor Company, Seoul (KR)

(72) Inventors: Jinyoung Yoo, Incheon (KR); Kilwoo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 366 days.

(21) Appl. No.: 14/559,220

(22) Filed: Dec. 3, 2014

(65) Prior Publication Data
US 2015/0292781 A1  Oct. 15, 2015

(30) Foreign Application Priority Data
Apr. 14, 2014  (KR) .......................... 10-2014-0044237

(51) Int. Cl.
*B60H 1/00* (2006.01)
*F25B 13/00* (2006.01)

(52) U.S. Cl.
CPC .......... *F25B 13/00* (2013.01); *B60H 1/00907* (2013.01); *B60H 2001/00935* (2013.01);
(Continued)

(58) Field of Classification Search
CPC ...... B60H 1/00907; B60H 2001/00935; B60H 2001/00942; F25B 13/00;
(Continued)

(56) References Cited

U.S. PATENT DOCUMENTS 4,055,963 A * 11/1977 Shoji ...................... F25B 13/00
237/2 B
4,165,037 A *  8/1979 McCarson .............. F24F 3/001
237/1 R
(Continued)

FOREIGN PATENT DOCUMENTS

CN         102216700 A      10/2011
CN         102692100 A       9/2012
(Continued)

OTHER PUBLICATIONS

English Translation for JP 2012201215 A.*

*Primary Examiner* — Jonathan Bradford
*Assistant Examiner* — Melodee Jefferson
(74) *Attorney, Agent, or Firm* — Morgan, Lewis & Bockius LLP

(57) ABSTRACT

A heat pump system in a vehicle connected with a refrigerant line through which refrigerant flows for controlling cooling/heating of a cabin of the vehicle, including a compressor for compressing refrigerant, an outdoor heat exchanger for condensing high temperature and high pressure refrigerant compressed at the compressor, and an expansion valve for expanding the refrigerant compressed thus, may include an indoor heat exchanger arranged between the compressor and the expansion valve connected to one another with the refrigerant line, and having a partitioned inside to form individual flow passages, and a first valve connected to the compressor, the outdoor heat exchanger and the indoor heat exchanger with the refrigerant line for changing a direction of a refrigerant flow according to cooling, heating, and dehumidifying modes of the vehicle to control the refrigerant flow along the refrigerant line.

4 Claims, 5 Drawing Sheets

(52) U.S. Cl.
CPC ............. *B60H 2001/00942* (2013.01); *F25B 2313/02323* (2013.01); *F25B 2313/02331* (2013.01); *F25B 2313/02333* (2013.01)

(58) Field of Classification Search
CPC .. F25B 2313/02323; F25B 2313/02331; F25B 2313/02333; F25B 2313/0315; F25B 2400/16; F25B 40/04; F25B 2313/0314; F25B 45/00; A61K 2300/00
See application file for complete search history.

(56) References Cited

U.S. PATENT DOCUMENTS

| | | | | |
|---|---|---|---|---|
| 4,308,042 A * | 12/1981 | Ecker | ................. | F24D 11/0221 126/585 |
| 4,598,557 A * | 7/1986 | Robinson | ................. | F24D 17/02 62/238.6 |
| 4,648,247 A * | 3/1987 | Takizawa | ................. | A47F 3/0447 62/256 |
| 4,774,977 A * | 10/1988 | Cohen | ................. | F16K 11/0525 137/271 |
| 4,964,281 A * | 10/1990 | Tanaka | ................. | A47F 3/0447 62/256 |
| 5,651,265 A * | 7/1997 | Grenier | ................. | F25B 13/00 165/45 |
| 5,860,290 A * | 1/1999 | Gregory | ................. | A47F 3/04 62/256 |
| 5,911,243 A * | 6/1999 | Cohen | ................. | F16K 11/0525 137/625.43 |
| 6,189,604 B1 * | 2/2001 | Yamauchi | ................. | B60H 1/00328 165/140 |
| 6,279,649 B1 * | 8/2001 | Osakabe | ................. | F28D 15/0266 165/104.21 |
| 6,340,052 B1 * | 1/2002 | Uehara | ................. | F28D 7/1684 165/158 |
| 6,422,308 B1 * | 7/2002 | Okawara | ................. | B60H 1/00921 165/202 |
| 6,442,951 B1 * | 9/2002 | Maeda | ................. | F24F 3/1423 62/271 |
| 6,668,569 B1 * | 12/2003 | Jin | ................. | F25B 13/00 62/197 |
| 9,074,716 B2 * | 7/2015 | Nomura | ................. | F16L 59/065 |
| 2002/0046570 A1 * | 4/2002 | Itoh | ................. | B60H 1/00907 62/324.1 |
| 2002/0148416 A1 * | 10/2002 | Cohen | ................. | F01P 7/16 123/41.1 |
| 2003/0042014 A1 * | 3/2003 | Jin | ................. | F25B 13/00 165/240 |
| 2004/0154331 A1 * | 8/2004 | Horiuchi | ................. | F25B 39/022 62/509 |
| 2004/0159121 A1 * | 8/2004 | Horiuchi | ................. | F25B 39/02 62/526 |
| 2005/0224221 A1 * | 10/2005 | Feuerecker | ................. | B60H 1/00914 165/202 |
| 2006/0086489 A1 * | 4/2006 | Ohata | ................. | F28F 9/0204 165/153 |
| 2006/0137371 A1 * | 6/2006 | Knight | ................. | F24F 3/153 62/196.4 |
| 2008/0190130 A1 * | 8/2008 | Murakami | ................. | F25B 13/00 62/324.3 |
| 2008/0197206 A1 * | 8/2008 | Murakami | ................. | F25B 13/00 237/2 B |
| 2009/0049857 A1 * | 2/2009 | Murakami | ................. | F25B 13/00 62/324.6 |
| 2009/0241573 A1 * | 10/2009 | Ikegami | ................. | B60H 1/00335 62/238.7 |
| 2010/0089080 A1 * | 4/2010 | Koh | ................. | F24F 5/0017 62/132 |
| 2011/0100614 A1 * | 5/2011 | Oh | ................. | F28D 1/05391 165/173 |
| 2011/0203299 A1 * | 8/2011 | Jing | ................. | F25B 13/00 62/80 |
| 2011/0239697 A1 * | 10/2011 | Styles | ................. | F25B 39/022 62/524 |
| 2011/0253353 A1 * | 10/2011 | Tokizaki | ................. | F25B 39/04 165/173 |
| 2012/0111050 A1 * | 5/2012 | Jang | ................. | F25B 13/00 62/510 |
| 2012/0241139 A1 * | 9/2012 | Katoh | ................. | F28D 1/0426 165/202 |
| 2012/0255703 A1 * | 10/2012 | Mishiro | ................. | F25B 39/00 165/11.1 |
| 2012/0261110 A1 * | 10/2012 | Katoh | ................. | B60H 1/00328 165/202 |
| 2012/0267074 A1 * | 10/2012 | Nishi | ................. | H01L 23/473 165/104.19 |
| 2013/0061631 A1 * | 3/2013 | Katoh | ................. | F28D 1/0426 62/515 |
| 2013/0075075 A1 * | 3/2013 | Tokuda | ................. | B60H 1/00278 165/202 |
| 2013/0199225 A1 * | 8/2013 | Lee | ................. | B60H 1/00907 62/176.1 |
| 2013/0220584 A1 * | 8/2013 | Mishiro | ................. | F25B 39/00 165/143 |
| 2014/0008044 A1 * | 1/2014 | Kim | ................. | B21D 53/02 165/109.1 |
| 2014/0374929 A1 * | 12/2014 | Fujita | ................. | F28D 21/0015 261/129 |
| 2016/0238140 A1 * | 8/2016 | Lee | ................. | F16K 1/228 |

FOREIGN PATENT DOCUMENTS

| | | | |
|---|---|---|---|
| CN | 103245008 A | 8/2013 | |
| EP | 0019736 A2 * | 12/1980 | ............. F25B 13/00 |
| JP | 5-90267 A | 4/1993 | |
| JP | 2002-243296 A | 8/2002 | |
| JP | 2012-201215 A | 10/2012 | |
| JP | 2012201215 A * | 10/2012 | ............. F28D 1/053 |
| KR | 20040063265 A * | 7/2004 | |
| KR | 10-2009-0102478 | 9/2009 | |
| KR | 20130059002 A * | 6/2013 | |
| KR | 10-2013-0087842 A | 8/2013 | |

* cited by examiner

FIG. 2

| VEHICLE MODE | FIRST VALVE | SECOND VALVE | INDOOR HEAT EXCHANGER | |
|---|---|---|---|---|
| | | | FIRST FLOW PASSAGE | SECOND FLOW PASSAGE |
| COOLING MODE (+ DEHUMIDIFICATION) | CONNECT BETWEEN OUTLET OF COMPRESSOR AND OUTDOOR HEAT EXCHANGER, CONNECT BETWEEN INDOOR HEAT EXCHANGER AND INLET TO COMPRESSOR | CONNECT FIRST FLOW PASSAGE | COOLING | COOLING |
| HEATING MODE | CONNECT BETWEEN OUTLET OF COMPRESSOR AND INDOOR HEAT EXCHANGER, CONNECT BETWEEN OUTDOOR HEAT EXCHANGER AND INLET TO COMPRESSOR | CUT OFF CONNECTION TO FIRST FLOW PASSAGE | - | HEATING |
| HEATING AND DEHUMIDIFYING MODE | CONNECT BETWEEN OUTLET OF COMPRESSOR AND INDOOR HEAT EXCHANGER, CONNECT BETWEEN OUTDOOR HEAT EXCHANGER AND INLET TO COMPRESSOR | CONNECT FIRST FLOW PASSAGE | COOLING | HEATING |

HEAT PUMP SYSTEM IN VEHICLE

CROSS-REFERENCE TO RELATED APPLICATION

The present application claims priority to Korean Patent Application No. 10-2014-0044237 filed in Apr. 14, 2014, the entire contents of which is incorporated herein for all purposes by this reference.

BACKGROUND OF THE INVENTION

Field of the Invention

The present invention relates to a heat pump system in a vehicle. More particularly, the present invention relates to a heat pump system in a vehicle, which embodies heating, cooling and dehumidifying functions with one heat exchanger which also performs a function of an evaporator.

Description of Related Art

In general, an air conditioner in the vehicle includes an air conditioner module for cooling and heating a cabin in the vehicle.

The air conditioner module is configured to cool the cabin with a heat exchange medium owing to heat exchange of the heat exchange medium with the evaporator, or to heat the cabin with cooling water by introducing the cooling water to a heater in a process in which the heat exchange medium discharged as a compressor is driven circulates to the compressor again through a condenser, a receiver drier, an expansion valve and the evaporator.

In the meantime, recently, as people take growing interests in energy efficiency and environmental pollution day by day, development of an environmentally-friendly vehicle which can replace an internal combustion engine vehicle is on demand. The environmentally-friendly vehicle includes, in general, an electric vehicle which is driven taking fuel cell or electricity as a power source, or a hybrid vehicle which is driven by using an engine and a battery.

Of such environmentally-friendly vehicles, different from the air conditioner in a general vehicle, the air conditioner in the electric vehicle has no heater used therein, and the air conditioner applied to the electric vehicle is called, in general, the heat pump system.

Though the heat pump system is the same with a general principle in which, in a room cooling mode in a summer, high temperature and high pressure gaseous refrigerant compressed at the compressor drops a room temperature and humidity by evaporation at the evaporator after passed through the receiver drier and the expansion valve after the refrigerant is condensed at the condenser, in a room heating mode in a winter, the heat pump system uses high pressure gaseous refrigerant as a heater medium.

That is, in the room heating mode, the electric vehicle has the high temperature and high pressure gaseous refrigerant heat exchanging with outdoor air introduced, not to an outdoor condenser, but to an indoor condenser, through a valve such that the outdoor air heat exchanged thus makes a temperature of the vehicle cabin to rise as the outdoor air is introduced to the cabin of the vehicle while passing through a PTC (Positive Temperature Coefficient) heater.

And, the high temperature and high pressure gaseous refrigerant introduced to the indoor condenser is condensed as the refrigerant heat exchanges with the outdoor air and discharged as liquid refrigerant, again.

However, though the related art heat pump system is required to include a dehumidifying mode for removing moisture from a window of the vehicle in middle of operation of a cooling mode in a summer or a heating mode in a winter, in order to operate the dehumidifying mode, it is required to add a heat exchanger to the heat pump system. Consequently, a problem is caused, in that an entire system package increases due to addition of an element and complicated pipe layout, and a production cost increases.

Moreover, if the heat exchanger is provided to the cabin, mounting of 3-way valves on pipelines is required, to open/close the valves frequently causing noise and poor durability, and the increased pipelines causes a large pressure loss with a poor overall NVH (noise vibration harshness) performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle having advantages of embodying heating, cooling and dehumidifying functions with one heat exchanger which also performs a function of an evaporator.

Accordingly, various aspects of the present invention are directed to providing a heat pump system in a vehicle, in which one heat exchanger partitioned to perform an evaporator function altogether is applied thereto for embodying cooling, heating and dehumidifying modes for simplifying elements to reduce a production cost, reduce a pressure loss by reducing a pipe length and simplifying a layout of pipelines to improve an overall NVH performance of a vehicle.

According to various aspects of the present invention, a heat pump system in a vehicle connected with a refrigerant line through which refrigerant flows for controlling cooling/heating of a cabin of the vehicle, including a compressor for compressing refrigerant, an outdoor heat exchanger for condensing high temperature and high pressure refrigerant compressed at the compressor, and an expansion valve for expanding the refrigerant compressed thus, may include an indoor heat exchanger arranged between the compressor and the expansion valve connected to one another with the refrigerant line, and having a partitioned inside to form individual flow passages, and a first valve connected to the compressor, the outdoor heat exchanger and the indoor heat exchanger with the refrigerant line for changing a direction of a refrigerant flow according to cooling, heating, and dehumidifying modes of the vehicle to control the refrigerant flow along the refrigerant line.

The indoor heat exchanger may include a first header tank connected to the expansion valve with the refrigerant line, a second header tank connected to the first valve, and a heat exchanger portion provided between the first header tank and the second header tank and having an inside partitioned by a partition wall provided in a length direction thereof to form first, and second flow passages.

The second header tank may be partitioned with a diaphragm provided at a position matched to the partition wall for introducing the refrigerant to a relevant one of the flow passages in the heat exchanger portion when the refrigerant is introduced thereto.

The partition wall may be formed of a heat transfer preventive material which prevents heat transfer from taking place between the refrigerants passing through the first flow passage and the second flow passage.

The first valve may be a 4-way valve.

The refrigerant line connected between the first valve and the first flow passage may have a second valve provided thereto further.

The second valve may be connected to an inlet to the compressor with a connection line.

The second valve may be a 3-way valve for supplying the refrigerant introduced from the first valve to the first flow passage or for supplying the refrigerant introduced from the first valve and the first flow passage to the compressor through the connection line according to the heating, cooling, or dehumidifying mode of the vehicle.

The second valve, in the heating mode of the vehicle, may close the refrigerant line connected to the first flow passage and may supply the refrigerant introduced thereto from the first valve to the compressor through the connection line.

The second valve, when dehumidification is required in middle of the heating mode of the vehicle, may open the refrigerant line connected to the first flow passage for introduction of the refrigerant, introduced thereto through the first vale discharged from the outdoor heat exchanger, into the first flow passage.

In the cooling mode of the vehicle, the first valve may connect between an outlet of the compressor and the outdoor heat exchanger and connect between the indoor heat exchanger and the inlet to the compressor, and the second valve may become to be in communication with the first flow passage.

In the heating mode of the vehicle, the first valve may connect between the outlet of the compressor and the indoor heat exchanger, and between the outdoor heat exchanger and the inlet to the compressor, and the second valve may cut off communication with the first flow passage.

In the heating and dehumidifying modes of the vehicle, the first valve may connect between the outlet of the compressor and the indoor heat exchanger, and between the outdoor heat exchanger and the inlet to the compressor, and the second valve may become in communication with the first flow passage.

Thus, the heat pump system in a vehicle in accordance with various embodiments of the present invention has advantages of embodying the cooling, heating, and dehumidifying modes to simplify elements thereof compared to the related art, as well as to minimize a number of valves mounted to the pipelines to save a production cost and simplify a package by making one heat exchanger having a partitioned inside to perform a function of an evaporator altogether.

And, the reduction of a pipeline length and the simplification of layout reduce a pressure loss, to improve overall NVH performance of the vehicle, thereby permitting to improve general marketability of the vehicle and general efficiency of the heat pump system.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 illustrates an operation table in cooling, heating, and dehumidifying modes of the exemplary heat pump system in the vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
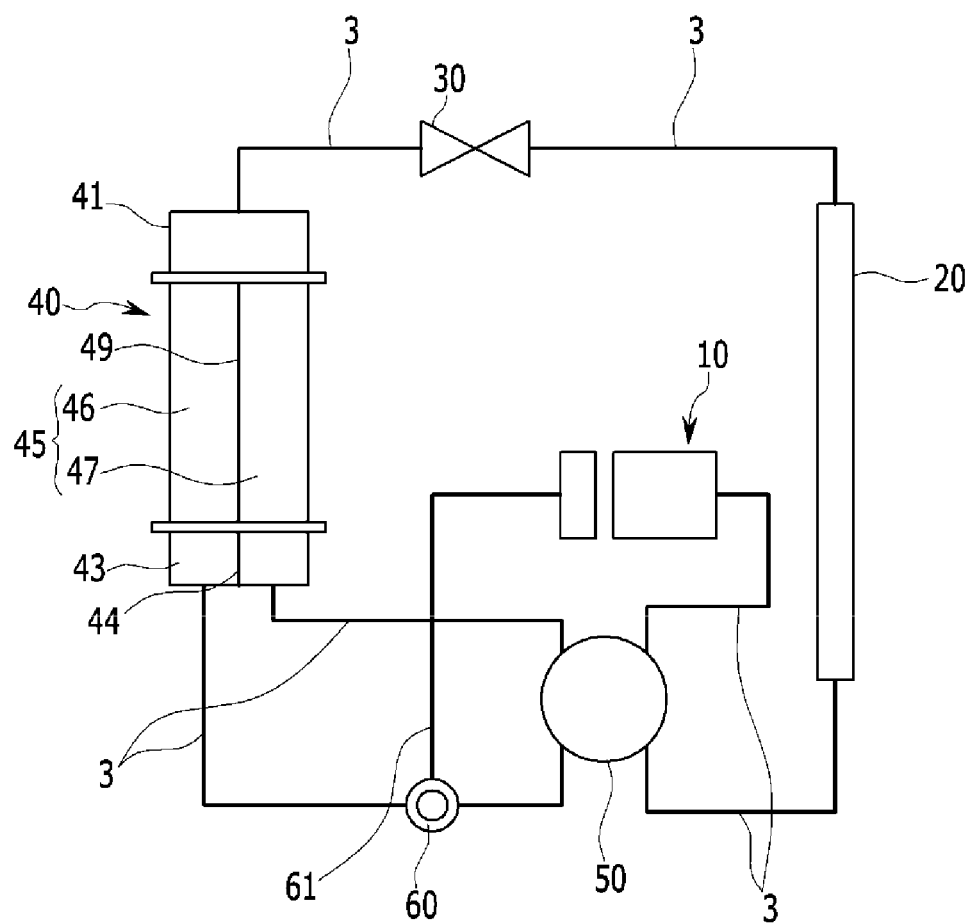
FIG. 1 illustrates a block diagram of an exemplary heat pump system in a vehicle according to the present invention.

FIG. 1 illustrates a block diagram of a heat pump system in a vehicle in accordance with various embodiments of the present invention.

Referring to FIG. 1, the heat pump system in a vehicle is connected with refrigerant line 3 through which refrigerant flows for controlling cooling/heating a cabin of a vehicle, and includes a compressor 10 for compressing the refrigerant, an outdoor heat exchanger (or outer heat exchanger) 20 for condensing high temperature and high pressure refrigerant compressed at the compressor 10, and an expansion valve 30 for expanding the refrigerant compressed thus.

In this case, the heat pump system in a vehicle in accordance with various embodiments of the present invention further includes an indoor heat exchanger (or inner heat exchanger) 40 and a first valve 50.

The indoor heat exchanger 40 is arranged between the compressor 10 and the expansion valve 30 connected to one another with the refrigerant line 3, and has a partitioned inside to form individual flow passages 46 and 47.

The indoor heat exchanger 40 includes first and second headers 41 and 43, and a heat exchanger portion 45.

The first header tank 41 is connected to the expansion valve 30 with the refrigerant line 3, and the second header tank 43 is connected to the compressor 10 or the outdoor heat exchanger 20 through the first valve 50, selectively.

And, the heat exchanger portion 45 is provided between the first header tank 41 and the second header tank 43 connecting the first header tank 41 and the second header tank 43 to each other, and has the inside thereof partitioned with a partition wall 49 provided in a length direction thereof to form the first and second flow passages 46 and 47.

In this case, the partition wall 49 may be formed of a heat transfer preventive material for preventing heat transfer from taking place between the refrigerants respectively passing through the flow passages 46 and 47 if the refrigerants are introduced to, and pass through the flow passages 46 and 47 selectively according to operation of the first valve 50.

The partition wall 49 may be constructed of a heat insulating board which prevents heat transfer.

Both of the first, and second flow passages 46 and 47 of the indoor heat exchanger 40 function as evaporators in the cooling mode of the vehicle.

Opposite to this, in the heating mode, the indoor heat exchanger 40 functions as a heater by introducing high temperature and high pressure refrigerant to the second flow passage 47 making the refrigerant to heat exchange with outdoor air, thereby introducing high temperature outdoor air to the cabin of the vehicle.

If dehumidification is required in this state, low temperature and low pressure refrigerant passed through the outdoor heat exchanger 20 is introduced to the first flow passage 46 of the indoor heat exchanger 40 to make the refrigerant to heat exchange with the outdoor air for directing low temperature outdoor air toward an inside surface of the window, thereby removing moisture from surfaces of the window.

That is, the indoor heat exchanger 40 having above function performs a function of two heat exchangers with the first, and second flow passages 46 and 47.

In the meantime, in various embodiments, the second header tank 43 may have an inside partitioned with a diaphragm 44 provided at a position matched to the partition wall 49 for making refrigerants respectively from the compressor 10 and the outdoor heat exchanger 20 to be introduced to the respective flow passages 46 and 47 of the heat exchanger portion 45.

And, the first valve 50 is connected to the compressor 10, the outdoor heat exchanger 20 and the indoor heat exchanger 40 with the refrigerant line 3, for changing a flow direction of the refrigerant according to the cooling, heating, or dehumidifying mode of the vehicle, thereby controlling the flow direction of the refrigerant flowing along the refrigerant line 3.

The first valve 50 is a 4-way valve for controlling the flow direction of the refrigerant according to the mode of cooling, or heating of the cabin of the vehicle in a state the first valve 50 is connected to the compressor 10, the outdoor heat exchanger 20, and the first, and second flow passages 46 and 47 of the indoor heat exchanger 40 with the refrigerant line 3.

In the meantime, in various embodiments, a second valve 60 may be provided to the refrigerant line 3 which is connected between the first valve 50 and the first flow passage 46, further.

The second valve 60 is connected to an inlet to the compressor 10 with a connection line 61.

In this case, the second valve 60 may be a 3-way valve for supplying refrigerant introduced from the first valve 50 to the first flow passage 46 or for supplying the refrigerant introduced from the first valve 50 and the first flow passage 46 to the compressor 10 through the connection line 61 according to the heating, cooling, or dehumidifying mode of the vehicle.

Hereafter, operation and effects of the heat pump system in a vehicle in accordance with various embodiments of the present invention will be described in detail.

Figure 3:
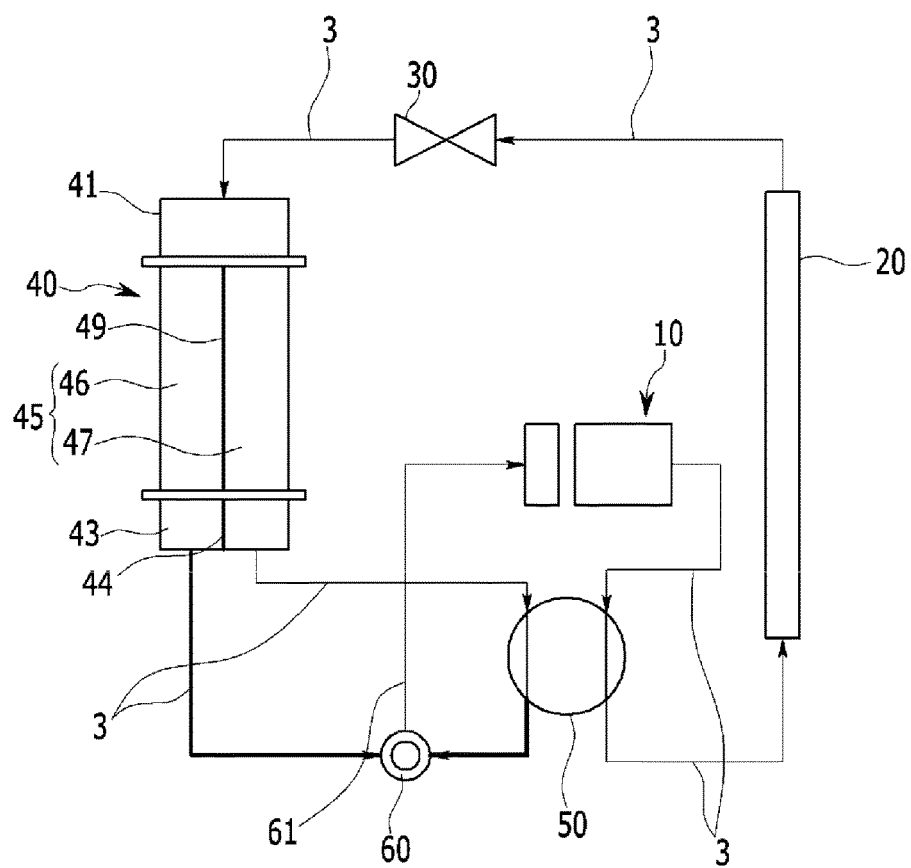
FIG. 3, FIG. 4 and FIG. 5 illustrate block diagrams showing operation states in cooling, heating, and dehumidifying modes of the exemplary heat pump system in the vehicle according to the present invention, respectively.
Figure 4:
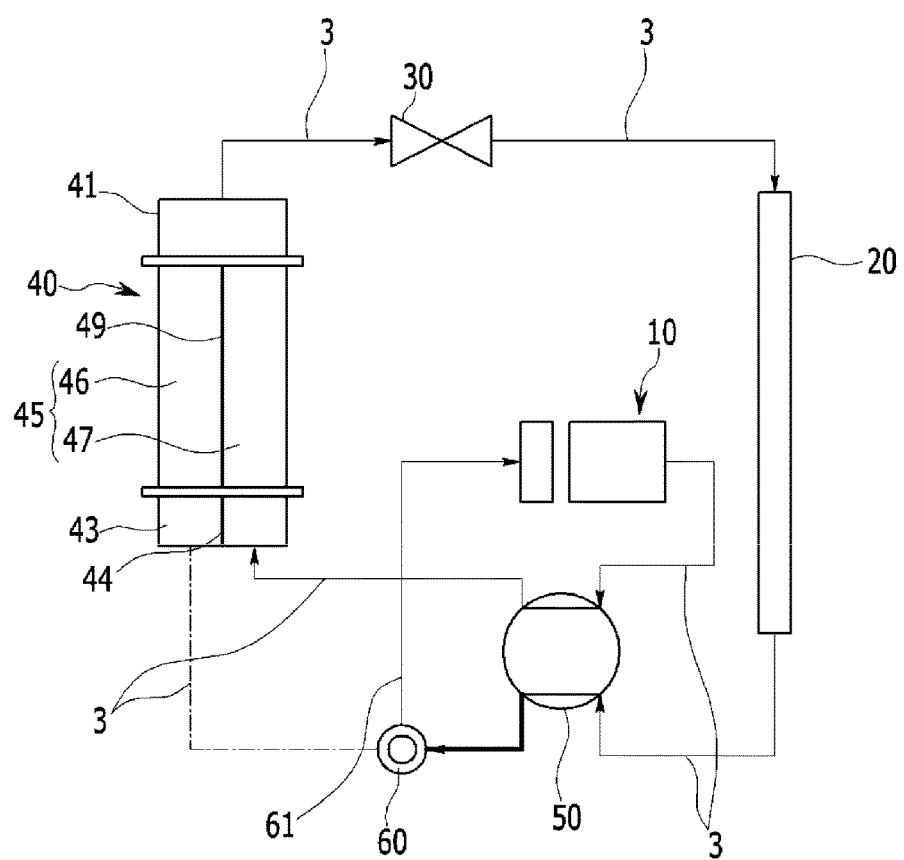
Figure 5:
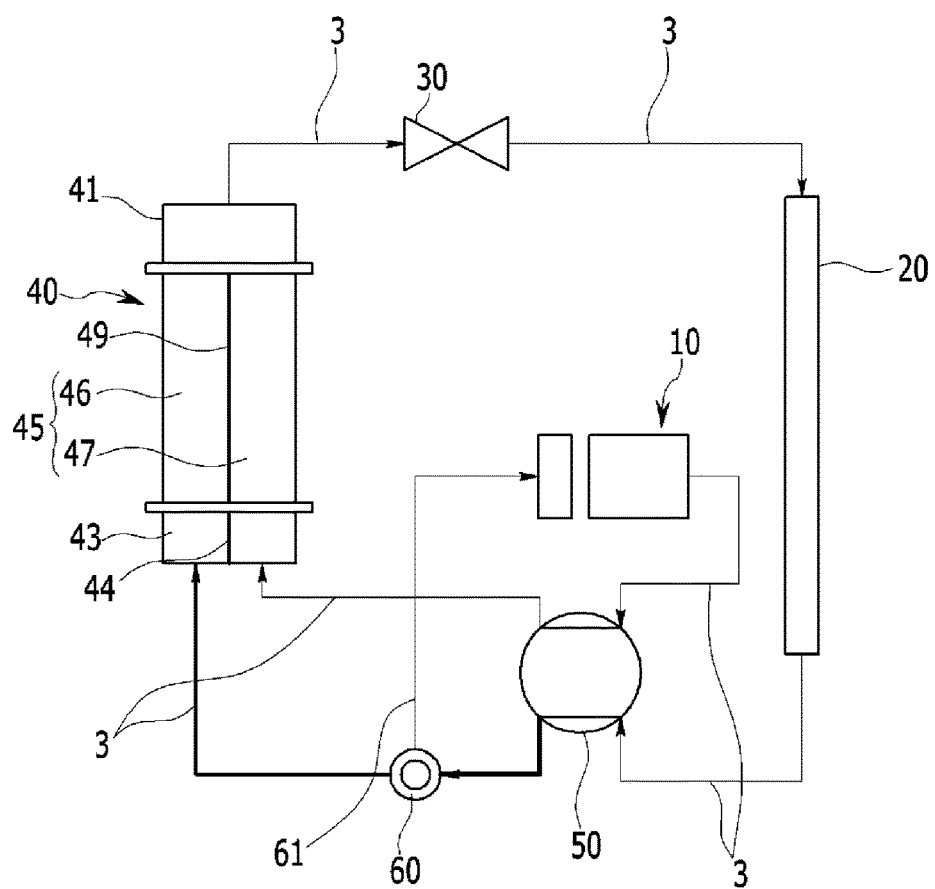

FIG. 2 illustrates an operation table in cooling, heating, and dehumidifying modes of a heat pump system in a vehicle in accordance with various embodiments of the present invention, and FIG. 3, FIG. 4 and FIG. 5 illustrate block diagrams showing operation states in cooling, heating, and dehumidifying modes of a heat pump system in a vehicle in accordance with various embodiments of the present invention, respectively.

Referring to FIG. 2 and FIG. 3, if the driver operates the heat pump system in a vehicle in accordance with various embodiments of the present invention in the cooling mode to cool the cabin of the vehicle, the refrigerant is discharged from the compressor 10 in a high temperature and high pressure state and introduced to the first valve 50.

In this case, the first valve 50 makes the refrigerant line 3 between the compressor 10 and the outdoor heat exchanger 20 connected within the first valve 50 for introducing the refrigerant introduced thereto from the compressor 10 to the outdoor heat exchanger 20.

Then, the high temperature and high pressure refrigerant discharged from the compressor 10 is passed through, and condensed at, the outdoor heat exchanger 20, passed through, and expanded at, the expansion valve 30, and introduced to the first header tank 41 of the indoor heat exchanger 40.

The refrigerant introduced to the first header tank 41 is passed through, and evaporates at, the first, and second flow passages 46 and 47 to a low temperature and low pressure state, while the outdoor air introduced to the vehicle heat exchanges with the low temperature and low pressure refrigerant to low temperature air and is introduced to the cabin of the vehicle for cooling the cabin of the vehicle.

That is, in the cooling mode of the vehicle, the indoor heat exchanger 40 performs a function of an evaporator, wherein the refrigerant passed through the expansion valve 30 passes through the heat exchanger portion 45 via the first header tank 41 and the first, and second flow passages 46 and 47, and flows to the first valve 50 and the second valve 60 through the second header tank 43.

In this case, the second valve 60 maintains a state in which the connection line 61 is opened, that is, the second valve 60 is in communication with the first flow passage 46, and the refrigerant passed through the first flow passage 46, and the refrigerant discharged through the second flow passage 47 and passed through the first valve 50 circulate to the compressor 10.

Referring to FIG. 2 and FIG. 4, if the driver operates the heat pump system in a vehicle in accordance with various embodiments of the present invention in the heating mode to heat the cabin of the vehicle, the high temperature and high pressure refrigerant discharged from the compressor 10 is introduced to the first valve 50.

In this case, the first valve 50 makes the refrigerant lines 3 between the compressor 10 and the second flow passage 47 of the indoor heat exchanger 40 to be connected to each other within the first valve 50 for supplying the refrigerant introduced from the compressor 10 to the second flow passage 47 of the indoor heat exchanger 40.

Then, the high temperature and high pressure refrigerant discharged from the compressor 10 passes through the second flow passage 47 through the second header tank 43 while heat exchanging with the external air introduced thereto from the outside of the vehicle, such that the external air having a temperature thereof risen by the heat exchange with the high temperature and high pressure refrigerant is introduced to the cabin of the vehicle to heat the cabin of the vehicle.

In this case, in the heating mode of the vehicle, the second valve 60 supplies the refrigerant introduced thereto from the first valve 50 to the compressor 10 through the connection line 61 in a state the second valve 60 closes the refrigerant line 3 connected to the first flow passage 46, i.e., in a state communication of the second valve 60 with the first flow passage 46 is cut off.

Accordingly, in the heating mode of the vehicle, the refrigerant is introduced to the outdoor heat exchanger 20 through the second flow passage 47 of the indoor heat exchanger 40 and the expansion valve 30 The refrigerant is introduced to the second valve 60 by operation of the first valve 50 in a condensed state because the refrigerant passes has passed through the outdoor heat exchanger 20. The refrigerant is then introduced to the compressor 10 again through the connection line 61 by way of valve 60.

In the meantime, referring to FIG. 2 and FIG. 5, in various embodiments, if dehumidification of the cabin is required in middle of the heating mode of the vehicle, the second valve 60 opens the refrigerant line 3 connected to the first flow passage 46, i.e., the second valve 60 is made to be in communication with the first flow passage 46, for introducing the refrigerant discharged from the outdoor heat exchanger 20 and introduced thereto through the first valve 50 to the first flow passage 46.

That is, if the dehumidifying mode is operated together with the heating mode of the vehicle, a portion of the low temperature and low pressure refrigerant passed through the outdoor heat exchanger 20 is introduced to, and passes through, the first flow passage 46 by operation of the second valve 60.

Then, the external air is cooled down by heat exchange with the low temperature and low pressure refrigerant being introduced to the first flow passage 46, such that the external air in a low temperature state flows toward the inside surface of the window in the cabin of the vehicle, thereby removing the moisture from the surface of the window. In this case, since detailed description of directing an air flow of the air heat exchanged with the first flow passage 46 toward the inside surface of the window is known to persons skilled in this field of art, the detailed description will be omitted.

That is, if the dehumidifying mode comes into operation in middle of operation of the heating mode of the vehicle, the heat pump system in a vehicle in accordance with various embodiments puts the second valve 60 into operation such that the first flow passage 46 of the indoor heat exchanger 40 cools down the external air being introduced thereto from an outside of the system.

Accordingly, the heat pump system in a vehicle in accordance with various embodiments of the present invention can make one indoor heat exchanger 40, which performs a function of an evaporator in the cooling mode and a function of a heater in the heating mode by the foregoing operation, to perform the cooling/heating modes, and the dehumidifying mode at the same time with the heating mode, of the cabin of the vehicle by operating the two valves of the first and second valves 50 and 60.

Eventually, if the heat pump system in a vehicle in accordance with various embodiments of the present invention is applied, by making one heat exchanger having a partitioned inside to perform a function of an evaporator altogether, the cooling, heating, and dehumidifying modes can be embodied to simplify elements thereof compared to the related art, as well as to minimize a number of valves mounted to the pipelines to save a production cost and simplify a package.

And, the reduction of a pipeline length and the simplification of layout reduce a pressure loss, to improve overall NVH performance of the vehicle, thereby permitting to improve general marketability of the vehicle and general efficiency of the heat pump system.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat pump system in a vehicle connected with a refrigerant line through which refrigerant flows for controlling cooling/heating of a cabin of the vehicle, including a compressor for compressing refrigerant, an outdoor heat exchanger for condensing high temperature and high pressure refrigerant compressed at the compressor, and an expansion valve for expanding the refrigerant compressed thus, comprising:
    an indoor heat exchanger arranged between the compressor and the expansion valve, connected to one another with the refrigerant line; and
    a first valve connected to the compressor, the outdoor heat exchanger and the indoor heat exchanger with the refrigerant line for changing a direction of a refrigerant flow to the compressor, the outdoor heat exchanger and the indoor heat exchanger according to cooling, heating, and dehumidifying modes of the vehicle to control the refrigerant flow along the refrigerant line,
    wherein the indoor heat exchanger includes:
        a first header tank connected to the expansion valve with the refrigerant line;
        a second header tank connected to the first valve and a second valve in parallel; and
        a heat exchanger portion provided between the first header tank and the second header tank, and having an inside partitioned by a partition wall, provided in a length direction thereof, to form first, and second flow passages,
    wherein the first valve connected to the second flow passage is a 4-way valve,
    wherein the refrigerant line connected between the first valve and the first flow passage has the second valve provided to the refrigerant line, the second valve connected to the first flow passage,
    wherein the second valve is connected to an inlet to the compressor with a connection line,
    wherein the second valve is mounted at a portion of the refrigerant line from which the connection line is branched, wherein the second valve is a 3-way valve directly receiving the refrigerant from the first valve, and wherein the 3-way valve is configured for supplying the refrigerant directly-introduced from the first valve and introduced from the first flow passage, to the compressor through the connection line, for supplying the refrigerant directly-introduced from the first valve, to the compressor through the connection line, or for supplying the refrigerant directly-introduced from the first valve, to the compressor through the connection line and to the first flow passage, according to the heating, cooling, or dehumidifying mode of the vehicle, wherein, when the vehicle is in the cooling mode, the first valve connects between an outlet of the compressor and the outdoor heat exchanger and connects between the indoor heat exchanger and the inlet to the compressor, and the second valve becomes to be in fluid-communication with the first flow passage, wherein, when the vehicle is in the heating mode, the first valve connects between the outlet of the compressor and the indoor heat exchanger, and between the outdoor heat exchanger and the inlet to the compressor, and the second valve cuts off fluid-communication with the first flow passage, or wherein, when the vehicle is in the heating and dehumidifying modes, the first valve connects between the outlet of the compressor and the indoor heat exchanger, and between the outdoor heat exchanger and the inlet to the compressor, and the second valve becomes in fluid-communication with the first flow passage.

2. The system of claim 1, wherein the second header tank is partitioned with a diaphragm connected to the partition wall, and in series with the partition wall, for introducing the refrigerant to the first flow passage or the second flow passage in the heat exchanger portion when the refrigerant is introduced thereto.

3. The system of claim 1, wherein the second valve, in the heating mode of the vehicle, closes the refrigerant line connected to the first flow passage and supplies the refrigerant introduced thereto from the first valve to the compressor through the connection line.

4. The system of claim 1, wherein the second valve, when dehumidification is required during the heating mode of the vehicle, opens the refrigerant line connected to the first flow passage for introduction of the refrigerant, introduced thereto through the first valve discharged from the outdoor heat exchanger, into to the first flow passage.

* * * * *